United States Patent [19]
Schröder et al.

[11] 3,980,094
[45] Sept. 14, 1976

[54] QUICK ACTION SLIDE VALVE

[75] Inventors: Fritz Schröder, Muhlheim (Main); Klaus Rössel, Offenbach (Main), both of Germany

[73] Assignee: Hoechst Aktiengesellschaft, Frankfurt am Main, Germany

[22] Filed: Apr. 3, 1975

[21] Appl. No.: 564,696

[30] Foreign Application Priority Data
Apr. 8, 1974  Germany............................ 2416967

[52] U.S. Cl.............................. 137/68 A; 251/203
[51] Int. Cl.²......................................... F16K 17/40
[58] Field of Search....................... 137/68 R, 68 A; 220/261; 251/203

[56] References Cited
UNITED STATES PATENTS

| | | |
|---|---|---|
| 2,712,881 | 7/1955 | Mathisen ....................... 137/68 A X |
| 3,013,571 | 12/1961 | Fulton............................. 137/68 A |
| 3,332,432 | 7/1967 | Marsh............................... 137/68 A |

*Primary Examiner*—Martin P. Schwadron
*Assistant Examiner*—Richard Gerard
*Attorney, Agent, or Firm*—Connolly and Hutz

[57] ABSTRACT

The quick action slide valve comprises a valve casing and a sliding plate sliding in an annular groove in the product pipe. The annular groove in the product pipe is closed by a collar and at the side opposite to the sliding plate braking means are provided to stop the plate inelastically when the slide valve is closed. The sliding plate is provided on one surface with wedges which slide upon bolts in the annular groove when the valve is closed. Guide means rigidly connected with the valve casing protrude into a recess of the sliding plate when the slide valve is open. In the said recess at the end of the guide means a propellant charge is mounted which is ignited by ignition means running to the outside through the guide means when a certain pressure is exceeded.

4 Claims, 4 Drawing Figures

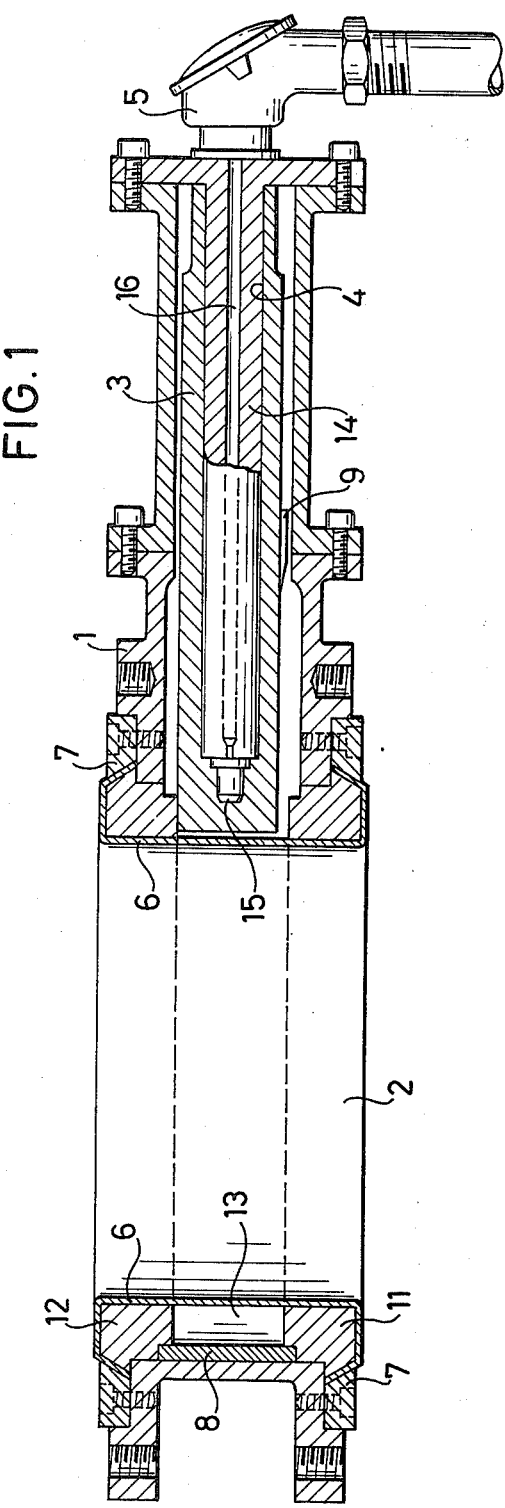

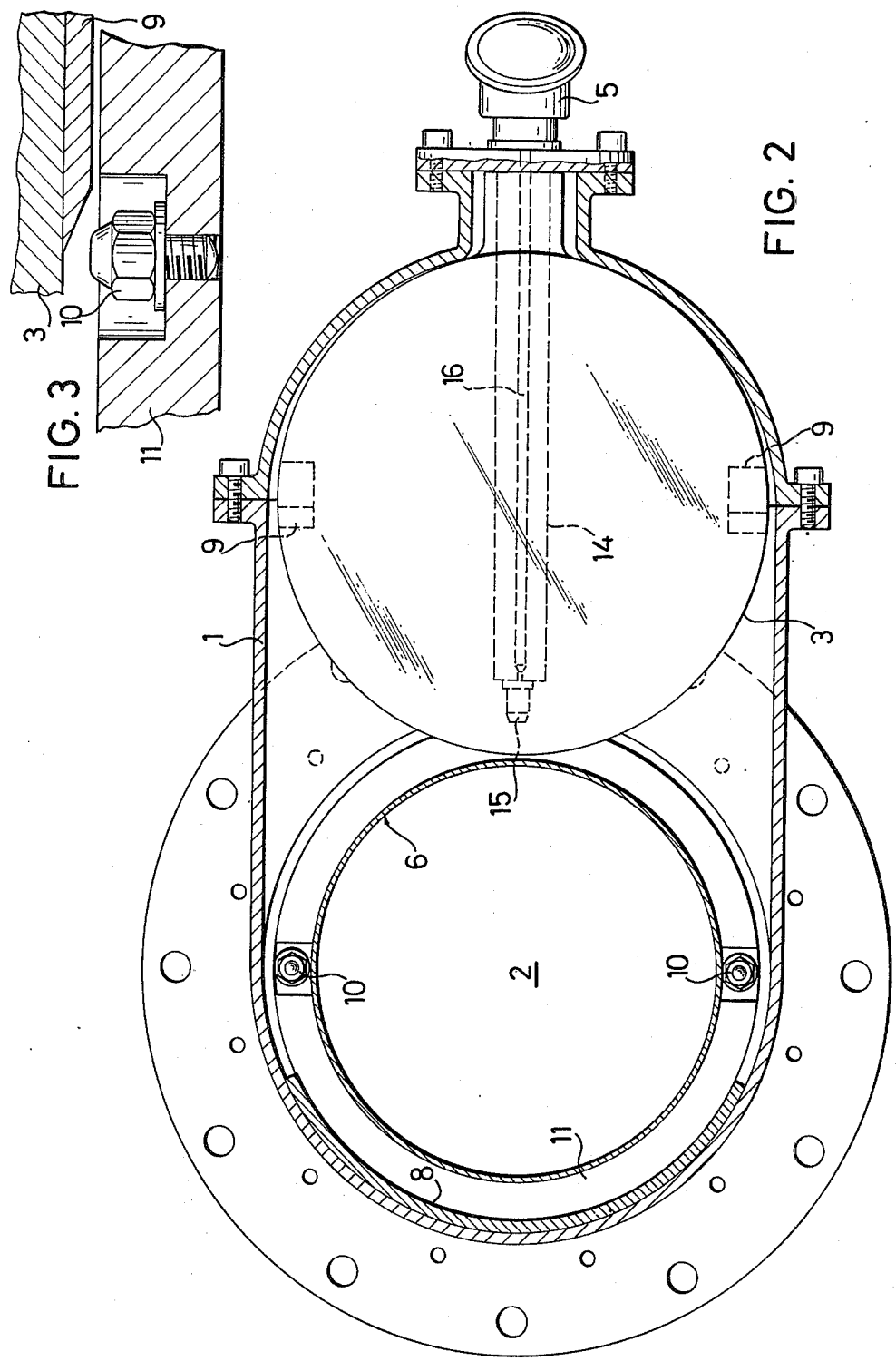

QUICK ACTION SLIDE VALVE

The present invention relates to a quick action slide valve the sliding plate of which is put in motion by a propellant charge.

Slide valves are shutoff devices in which the sealing element, i.e. the sliding plate, is actuated in transverse direction with respect to the pipe through which the product is transported. The casing, especially the product pipe, is provided with an annular groove in which the sliding plate is actuated by means of a threaded spindle or an articulated lever mechanism. In general, the annular groove forms the sealing surfaces in the slide valve casing. The sliding plate must be completely withdrawn from the product pipe and hence, it has to cover a large distance. In the known actuating systems for the sliding plate a relatively long period of time is required until the plate is lifted. This is a drawback of slide valves in pipe systems in which materials liable to explosion, such as gases and dust-forming substances, are transported.

In the processing of certain materials, for example grinding, mixing and conveying, explosions may occur, for example dust explosions in the milling, mixing and pneumatic conveyance of dyestuffs, plastic materials and grain and corn products. To ensure the working safety of processing plants of this type with regard to the operating personnel and the installation itself it is desirable to install in the pipe system of the processing plants means which prevent an explosion from expanding throughout the entire system. To this effect slides have been proposed. In view of the fact that in the case of an explosion the pressure wave always runs ahead of the flame front, the pressure wave can be used as an alarm signal to shut the slides. Suitable detectors are installed in the plant at the points where explosions are most likely to occur. They record an explosion and put in action the shutting mechanism of the slide valve. In comparison with the speed of expansion of the pressure wave and the following flame front the shutting mechanism is, however, too slow. It is not possible to seal the pipe system as fast as necessary to prevent expansion of the explosion. The explosion is not restricted to its site of origin, it expands almost without hindrance over the entire system whereby secondary explosions are frequently initiated, which are generally more violent than the primary explosion owing to the vigorous source of ignition.

Attempts have already been made to hinder the expansion of explosions by locks of the bucket wheel type in the pipe system. Such a lock tightly shuts the pipe system in any position but it has the disadvantage that it may get clogged or incrustations may form therein so that the devices must be frequently turned off for cleaning of the bucket wheel lock.

It has also been proposed to install in the pipe systems screw conveyors scraping along the inner wall, but it has been ascertained that a spreading out of explosions cannot be hindered in this way.

It is the object of the present invention to provide a valve which shuts so rapidly that at least the flame front following an explosion is held back.

The quick action slide valve according to the invention comprises a valve casing and a sliding plate sliding in an annular groove in the product pipe, wherein the annular groove in the product pipe is closed by a collar, at the side opposite to the sliding plate braking means are positioned in the annular groove to stop the plate inelastically when the slide valve is closed, and bolts are fitted in the annular groove, the sliding plate being provided on one surface with wedges which slide upon the bolts in the annular groove when the valve is closed and having a recess into which guide means rigidly connected with the valve casing protrude when the slide valve is open, and in the said recess at the end of the guide means a propellant charge being mounted which is ignited by ignition means running to the outside through the guide means when a certain pressure is exceeded.

The invention will now be described by way of example with reference to the accompanying drawing in which FIG. 1 is a sectional slide elevation of a quick action slide valve;

FIG. 2 is a sectional top view of the slide valve;

FIG. 3 is a cross sectional view on an enlarged scale of the position of wedge and bolt when the slide valve is nearly shut.

Figure 4:
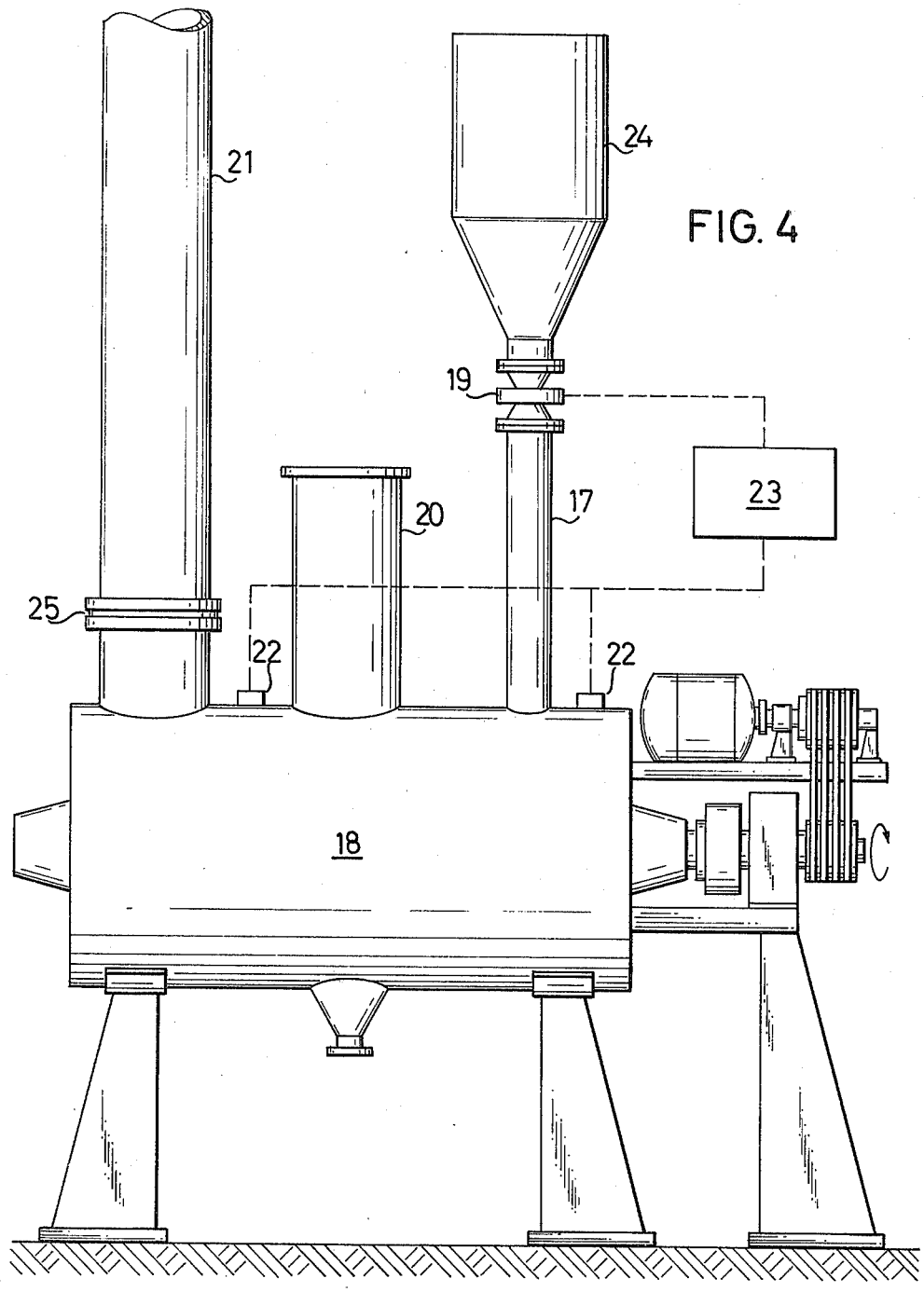
FIG. 4 represents a mixing plant with quick action slide valve according to the invention in the product pipe.

In the casing 1 the product pipe 2 is provided with an annular groove 13 formed by rings 11 and 12. The annular groove is covered by a collar 6 so that no dead spaces are formed in the product pipe where dust or any other material could deposit. The collar extends over the entire inner circumference of the product pipe and is fastened on casing 1 by rings 7. When the slide valve is open the sliding plate 3 is also covered by collar 6 and invisible from the product pipe. On the side opposite to the sliding plate 3 braking means 8, for example a lead plate, are seated in the annular groove 13. The braking means serve to stop the sliding plate as inelastically as possible. In the annular groove 13 are further mounted, for example on ring 11, two bolts 10 on to which wedges 9 mounted on one surface of the sliding plate slide when the plate closes the product pipe. The wedges 9 press the sliding plate 3 against ring 12 which may be a sealing ring. The sliding plate 3 is provided with a recess 4, for example a boring, into which guide means 14, for example a piston, protrude when the plate is in open position and on which the plate slides. Between the free end of the guide means and the rim of the sliding plate a propellant charge 15 is placed in the recess. The propellant charge may, or course, also be fastened on the free end of the guide means itself. The propellant charge is preferably ignited electrically through a cable or mechanically with a lever system (not shown) led to the outside through the guide means. The guide means 14 are rigidly connected with the casing 1. In the present case, the propellant charge is ignited electrically by cables (not shown) passing through a boring 16 in guide means 14 to a junction box 5.

When the propellant charge has been ignited the sliding plate 3 tears open collar 6 and bounces against braking means 8. At the same time, the wedges 9 press against bolts 10, whereby the sliding plate 3 is pressed against sealing ring 12. In this manner the product pipe is shut and the fire cannot expand.

FIG. 4 illustrates a simple mixing device. The material to be mixed is taken from storage tank 24 and transferred to the mixer 18 via conduit 17 into which a quick action slide valve 19 according to the invention has been installed. The mixer is provided with a ventilation system 20 with dust filter and pressure relief pipe 21 with bursting disk 25. In the mixer pressure transmitters 20 are installed at several points which are connected with a control instrument 23. The quick action slide valve 19 is likewise connected with the control instrument 23. When a certain pressure is exceeded in the mixer, for example owing to an explosion, the propellant charge of the slide valve is ignited by the control instrument and conduit 17 is shut off immediately.

What is claimed is:

1. A quick-acting slide valve comprising a valve casing having a pair of connections to a pipeline defining a flow path for a substance, the casing comprising a flow-conducting portion and an auxiliary portion, an annular groove in the flow-conducting portion, a sliding plate having a path of movement in the plane of the plate from a position in which it is disposed in the auxiliary portion when the flow path is opened and in the annular groove in the closed position of the valve, a frangible collar disposed over the annular groove to seal it when the slide plate is disposed in the auxiliary portion, the collar being frangible to cause it to break up upon impact out of the path of the slide plate when the plate is moved to the closed position, inelastic shock-absorbing means disposed in the annular groove for cushioning the movement of the slide plate when it is moved to the closed position, projections disposed in the annular groove, and the sliding plate having on one surface thereof wedges for engaging the projections for urging the plate against one side of the annular groove for sealing the valve against flow through it, the sliding plate having a longitudinal recess, a longitudinal guide means rigidly connected to the auxiliary portion of the valve casing for engagement by the sliding plate when the sliding plate is disposed in the auxiliary portion and the flow path is opened, the guide means being long enough to guide the sliding plate into the annular groove, a propellant charge means disposed in the recess for exerting a closing pressure against the sliding plate when the propellant charge means is actuated, ignition means connected to the propellant charge means and constructed and arranged for connection outside of the casing for actuating the slide plate to the closed position, and sensing means connected to the pipeline which is constructed and arranged to actuate the ignition means to exert a closing pressure on the sliding plate for immediately closing the valve when a predetermined condition occurs.

2. A quick-acting slide valve as set forth in claim 1 wherein the guide means comprises an elongated rod in the auxiliary portion disposed substantially perpendicular to the flow path, and the recess is constructed and arranged for slidably engaging over the rod.

3. A quick-acting slide valve as set forth in claim 1 wherein the propellant charge means is disposed in the base of the recess.

4. A quick-acting slide valve as set forth in claim 1 wherein the sensing means comprises a pressure-sensing means which is constructed and arranged for actuating the ignition means when a predetermined pressure is exceeded in the pipeline.

* * * * *